W. L. ALEXANDER.
COMBINED VEHICLE AXLE AND WHEEL.
APPLICATION FILED MAY 14, 1912.
1,125,432.
Patented Jan. 19, 1915.
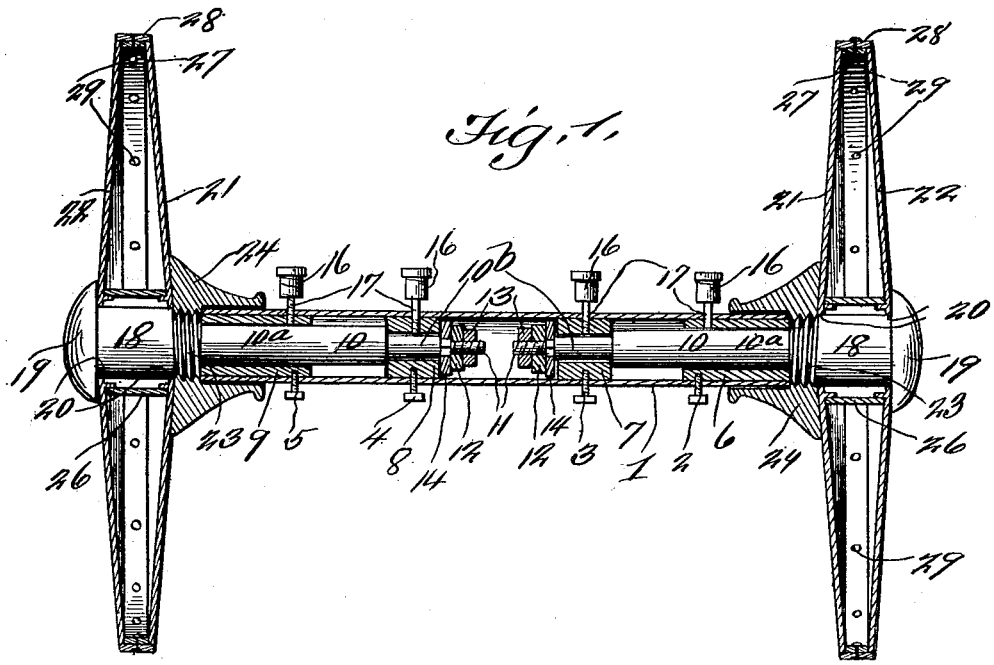
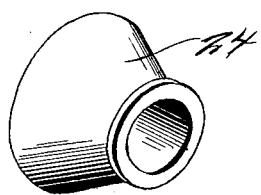
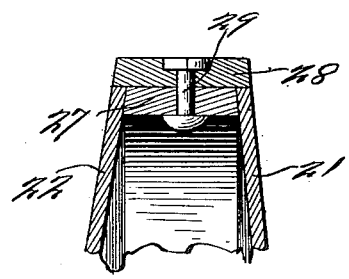
Witnesses
Francis T. Boswell,
C. E. Clements,
Inventor
W. L. Alexander,
By D. Swift & Co.
Attorneys

UNITED STATES PATENT OFFICE.

WILLIAM L. ALEXANDER, OF OMEGA, OKLAHOMA.

COMBINED VEHICLE AXLE AND WHEEL.

1,125,432.  Specification of Letters Patent.  Patented Jan. 19, 1915.

Application filed May 14, 1912. Serial No. 697,331.

*To all whom it may concern:*

Be it known that I, WILLIAM L. ALEXANDER, a citizen of the United States, residing at Omega, in the county of Kingfisher and State of Oklahoma, have invented a new and useful Combined Vehicle Axle and Wheels; and I do hereby declare the following to be a full, clear and exact description of the invention such as will enable others skilled in the art to which it appertains to make and use the same.

This invention relates to a new and useful combination axle and wheels therefor.

The principal object of the invention is to provide an improved device of this nature, in which various features of construction exist.

The various features of construction are hereinafter set forth, shown in the drawings, and claimed.

In the drawings:—Figure 1 is a sectional view through the improved axle with wheels combined. Figs. 2 and 3 are detail views.

Referring to the drawings 1 designates the axle, which comprises a tubular member constructed of any suitable drawn material, so as to be without a seam. Held by set screws or other means 2, 3, 4 and 5, in the tubular member are bushings 6, 7, 8 and 9, which constitute bearings for the spindles 10. The bushings 6 and 9 act as bearings for the portions 10$^a$ of the spindles 10, while the bushings 7 and 8 act as bearings for the reduced portions 10$^b$ of the spindles. The portions 10$^b$ of the spindles are provided with threaded extensions 11, to which are applied the nuts 12, for preventing outward movement of the spindles. The lock nuts 13 prevent the nuts 12 from unscrewing, there being washers 14 arranged between the nuts 12 and the bushings 7 and 8. The axle is provided with a series of oil cups 16, the extensions 17 of which pass through the bushings 6, 7, 8 and 9.

The spindles are provided with enlarged portions 18, which terminate in heads 19. The enlarged portions extend through the central openings 20 of the disks 21 and 22 of the wheels, and engaging the threads 23 of the enlarged portions are sleeves 24, in which the ends of the tubular member 1 extend. These sleeves 24 are permanently out of contact with the tubular member or axle 1, owing to the fact that the bushings 6 and 9 are so arranged with respect to the portions 10$^a$ of the spindles 10, as to maintain this feature. The disks 21 and 22 are arranged between the heads 19 and the sleeves 24. In order to brace the disks and hold them spaced apart, thimbles 26 are provided, which surround the enlarged portions 18. Between the outer annular portions of the disks of each wheel an inner rim 27 is arranged, which holds the disks separated. Surrounding the peripheral edges of the disks 21 and 22 are outer rims 28, which are bolted to the inner rims by the bolts, rivets or the like 29, thereby, in combination with the structure adjacent the large portions 18 of the spindles, substantial wheels having strength and rigidity are provided. The rim 27 is substantially one-third less in width than each rim 28.

In removing the wheel from the axle, it is first necessary to remove the set screws and the tubes of the oil cups 16, after which the spindles and the bushings are withdrawn from the axle. At this point, if it is desired to disassemble the wheels, the bushings should be detached, by removing the nuts 12 and the lock nuts 13, after which the sleeves 24 may be unscrewed, then it will be readily seen that the disks 21 and 22 may be separated.

From the foregoing it will be noted, there has been devised an efficient vehicle axle and wheels combined, and one which has been found desirable and practical, for use upon any construction of vehicle or the like.

The essential advantage of this improved device is the fact that the wheels cannot be removed from the spindles, until they are first removed from the axles. The disks of the wheels are designed to be constructed of sheet metal, and the thimbles are held in place by the flanges 31 of the disks.

During the prosecution of this patent case there were a number of prior patents cited as anticipating the broad or generic structure of the present device, said prior patents being enumerated as follows; J. Donovan, May 21, 1895, Patent No. 529,612; A. L. Hockett, April 8, 1902, Patent No. 697,341; E. A. Wible, Dec. 30, 1879, Patent No. 223,203; A. B. White, Oct. 22, 1889, Patent No. 413,217; J. Pettinger, dated April 12, 1887, Patent No. 361,076; T. Byrd, dated May 15, 1900, Patent No. 649,807; R. L. Harrell, dated Nov. 1, 1910, Patent No. 974,662; and Clark, dated Nov. 10, 1903, Patent No. 743,829. In view of the foregoing prior patents, the inventor is well aware that the broad or generic structure of a combined axle and hub spindle structure has been heretofore devised, and does not attempt to claim such broad or generic structure, as shown in said prior patents. But, however, said inventor has a right and does claim the particular and definitely stated structure comprising a cylindrical member, constituting a combined axle and hub spindle having a solid head at one end; a band surrounding and spaced from the spindle, constituting a combined hub and wheel sides spacing element; and a combined hub sleeve and clamp, detachably connected to the spindle, for clamping a wheel, with said band intermediate its sides, between the head and the sleeve, which telescopes over a bearing for the spindle, as specifically and definitely specified in the appended claim.

The invention having been set forth, what is claimed as new and useful is:—

In a wheel and axle construction; a cylindrical member, constituting a combined axle and hub spindle having a solid head at one end; a supporting bearing for the spindle; a wheel on said spindle; a part surrounding the spindle and arranged between the sides of the wheel; and a combined hub sleeve and clamp, detachably connected to the spindle, for clamping the wheel, between the head and the sleeve, and which telescopes over said bearing.

In testimony whereof I have signed my name to this specification in the presence of two subscribing witnesses.

WILLIAM L. ALEXANDER.

Witnesses:
 HARRIET SPEICE,
 J. M. SPEICE.

Copies of this patent may be obtained for five cents each, by addressing the "Commissioner of Patents, Washington, D. C."